UNITED STATES PATENT OFFICE.

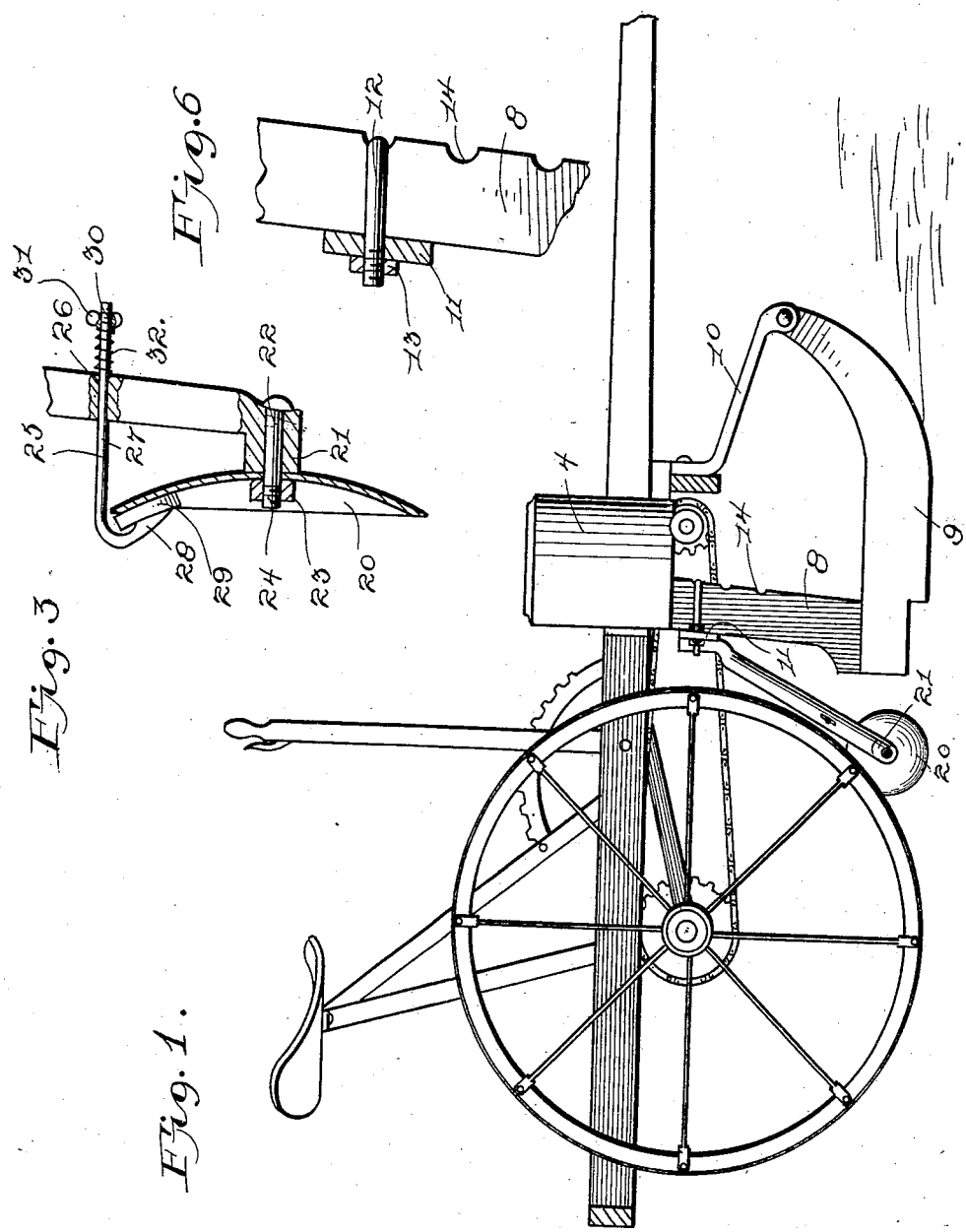

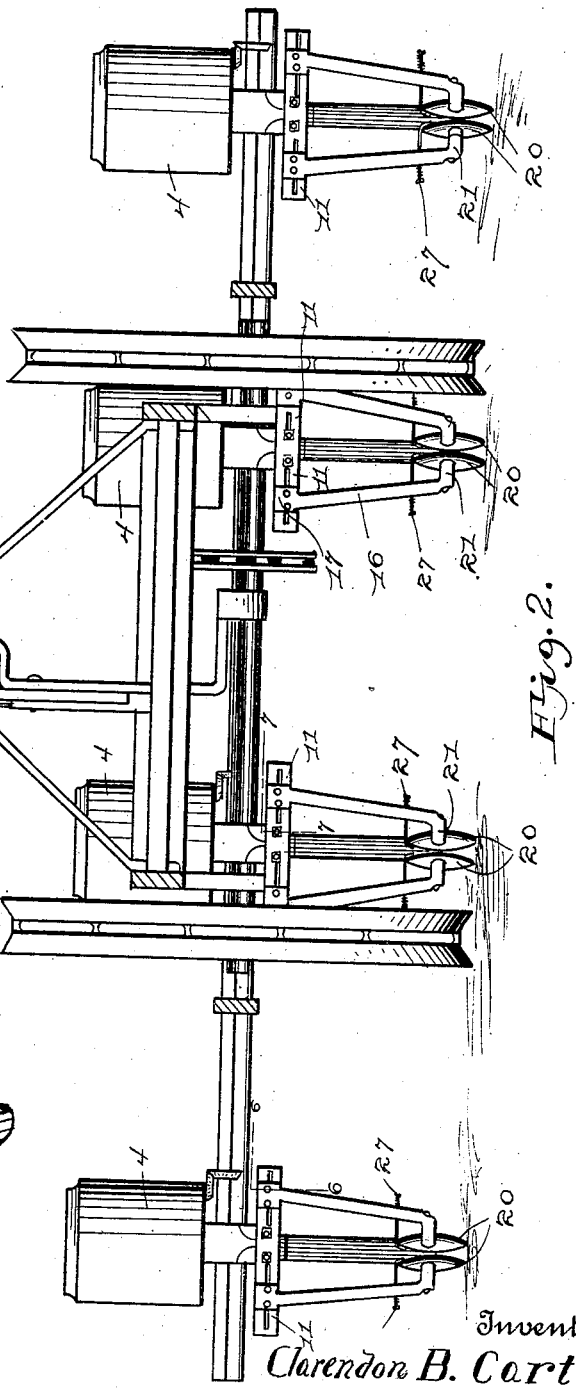

CLARENDON B. CARTER, OF KEOTA, IOWA.

SEED-PLANTER.

969,338.  Specification of Letters Patent.  Patented Sept. 6, 1910.

Application filed August 24, 1909. Serial No. 514,398.

*To all whom it may concern:*

Be it known that I, CLARENDON B. CARTER, a citizen of the United States, residing at Keota, in the county of Keokuk and State of Iowa, have invented certain new and useful Improvements in Seed-Planters, of which the following is a specification, reference being had therein to the accompanying drawing.

This invention relates to seed or corn planters, and has for its object the provision and means for covering up the seed after the same has been deposited in the ground.

Another object of this invention is the provision of means for cleaning the disks which are adapted to travel in the rear of the seed tube.

With these and other objects in view, this invention consists of certain novel constructions, combinations and arrangements of parts as will be hereinafter fully described and claimed.

In the drawings: Figure 1 is a side elevation of the same. Fig. 2 is a rear view of the planter. Fig. 3 is a section of the disk, showing the same secured to its support. Fig. 4 is a perspective view of the bar adapted to support the disk-supporting arms. Fig. 5 is an enlarged section taken on line 6—6 of Fig. 3, and Fig. 6 is a section taken on line 7—7 of Fig. 3.

Referring to the drawings by numerals 1 designates the frame, which is supported in the usual manner by means of wheels 2. The frame 1 carries at its front end a seed-box and supporting member 3. To the seed-box supporting member 3 are secured a plurality of seed-boxes 4, and a shaft 5 is journaled upon the frame 1 and is driven by means of a sprocket chain 6 which coöperates with the axle 7 which is supported by wheels 2. The shaft 5 actuates the feed means from the seed box 4 and controls the dropping of the seed into the ground. Seed tubes 8 are carried by seed boxes 4 and the seed tubes 8 carry at their lower ends the shoes 9. The outer ends of the shoes 9 are supported by means of link members 10 which link members are secured at one end to the frame 1. The bars 11 are carried by the seed tubes 8 and are held upon the seed tubes 8 by means of substantially U-shaped members 12 which straddle the seed tubes 8 and have threaded upon their outer ends nuts 13. The seed tubes 8 are provided upon one side by a plurality of notches 14 and the substantially U-shaped member 12 engages the notches 14 and is thereby held in a set position and is prevented from sliding upon the seed tubes 8. It will therefore be obvious that by having the nuts 13 threaded upon the outer ends of the substantially U-shaped member 12 that the bar 11 will be firmly clamped between the nuts and the seed tubes 8, and that by having the notches formed upon one side of the seed tube, that the bar can be positioned upon the seed tubes at different heights. The bar 11 is provided near each end with longitudinally extending slots 15, in which slots are adapted to work the securing means for the disk-supporting arms hereinafter described.

The disk-supporting arms 16 are provided with upper enlarged ends 17 through which pass bolts 18 and said bolts 18 work in the slots 15 of the member 11 and nuts 19 are threaded upon the outer ends of the bolts 18 and hold the bolt against displacement from the slot 15. By having a structure as specified it will be obvious that the disk-supporting arm 16 can be adjusted upon the bar 11 and the disks 20 hereinafter described, can be adjusted so as to have the same near together or farther apart. The disk-supporting arms 16 are provided near their lower ends with laterally extending portions 21 and bolts 22 pass through the laterally extending portions 21 and secure the disks 20 to the outer ends of the laterally extending portions 21. The disk is firmly held upon the bolt and in engagement with the outer end of the laterally extending portion 21 by means of a nut 23 which is threaded upon the outer screw-threaded end of the bolt 22.

Scraper means 25 are carried by the disk-supporting arms 16 and pass through an aperture 26 formed in the disk-supporting arm 16. The scraper means 25 comprises a body portion 27 which terminates at its outer end in an angularly disposed portion 28, which portion carries a scraper shoe 29 which shoe is adapted to engage the concave portion of disk 20 and keep the same free from any material which would be likely to collect thereon. The outer end of the body portion 27 of the scraper means 25 is threaded at 30 and a thumb screw 31 is adapted to be threaded thereon. The coil spring 32 is interposed between the disk-supporting arm 16 and the thumb screw 31 and normally exerts an outward pressure upon the thumb screw 31 and holds the shoe 29 firmly in position with the concave side of the disk 20. It will be obvious that by having the thumb screw threaded upon the outer end 30 that the tension of the coil spring 32 can be regulated.

The disks 20 are adapted to be supported by means of the disk-supporting members 16 directly in the rear of the seed tubes 8 so as to cover the furrow made by the shoe 9 and cover the seed which has been deposited therein. The disks are farther apart at their front ends than at their rear ends and therefore it will be obvious that as the planter travels forward that the disk traveling in the rear of the seed tubes will readily cover the seed after the same has been deposited in the furrow formed by the shoe 9.

What I claim is:—

A device of the class described comprising a disk-supporting member, a disk carried by said disk-supporting member, said disk-supporting member provided with a transversely extending aperture, scraper means, said scraper means comprising a body provided with an angularly disposed end, a shoe carried by said angularly disposed end and adapted to engage said disk, the body portion of said scraper means passing through said transversely extending aperture, a nut threaded upon one end of said body portion, and spring means positioned between said nuts and disk-supporting member and adapted to hold said shoe in engagement with said disk.

In testimony whereof I hereunto affix my signature in presence of two witnesses.

CLARENDON B. CARTER.

Witnesses:
W. A. SANDERS,
R. H. HENRY.